United States Patent [19]

Davis et al.

[11] Patent Number: 5,381,624
[45] Date of Patent: Jan. 17, 1995

[54] AGRICULTURAL CHEMICAL APPLICATOR

[76] Inventors: D. Darryl Davis, 1721 E. 7th St.;
Marlin H. Anderson, Jr., 306
Marietta Dr., both of Hopkinsville,
Ky. 42240

[21] Appl. No.: 253,571

[22] Filed: Jun. 3, 1994

Related U.S. Application Data

[63] Continuation of Ser. No. 174,424, Dec. 28, 1993, abandoned, which is a continuation of Ser. No. 861,311, Mar. 31, 1992, abandoned.

[51] Int. Cl.$^6$ .................................................. A01G 13/00
[52] U.S. Cl. .......................................... 47/1.7; 47/1.5
[58] Field of Search ..................................... 47/1.7, 1.5

[56] References Cited

U.S. PATENT DOCUMENTS

| | | | |
|---|---|---|---|
| 3,016,653 | 1/1962 | Gardmer | 47/1.7 |
| 3,959,924 | 6/1976 | Allen | 47/1.7 |
| 4,187,638 | 2/1980 | Hardy et al. | 47/1.5 |
| 4,206,569 | 6/1980 | Randolph | 47/1.7 |
| 4,257,190 | 3/1981 | Dykes | 47/1.7 |
| 4,567,689 | 2/1986 | Lemong | 47/1.7 |
| 4,709,505 | 12/1987 | Lempa, Jr. | 47/1.7 |
| 4,991,341 | 2/1991 | Douglas | 47/1.7 |
| 5,222,324 | 6/1993 | O'Neall | 47/1.7 |

OTHER PUBLICATIONS

Farm Journal, Dec., 1991, p. 184.

*Primary Examiner*—Henry E. Raduazo
*Attorney, Agent, or Firm*—Edward D. Lanquist, Jr.; Mark J. Patterson; I. C. Waddey, Jr.

[57] ABSTRACT

The present device relates to an agricultural chemical applicator for applying herbicides. The system is activated by a sensor bar having a plurality of conductive wire rod sensors. When a sensor contacts an unwanted plant, a detector and control circuit detects the current leakage and activates a time delay circuit which uses two timers in series and an opto-isolator to activate a solenoid valve. When a particular sensor is activated, a particular valve will be opened, thereby sending chemicals through a specific nozzle. Each sensor has its own circuit and its own nozzles.

19 Claims, 4 Drawing Sheets

AGRICULTURAL CHEMICAL APPLICATOR

This application is a continuation of application Ser. No. 08/174,424, filed Dec. 28, 1993 which is a continuation of application Ser. No. 07/861,311, filed Mar. 31, 1992, both now abandoned. This application is a continuation of application Ser. No. 07/861,311, filed Mar. 31, 1992, now abandoned.

BACKGROUND OF THE INVENTION

The present invention relates generally to a device for spraying herbicides and more specifically to an agricultural chemical applicator for selectively applying herbicides and other chemicals to plants.

It will be appreciated by those skilled in the art that weeds and other unwanted plants grow in the same area as crops. These unwanted plants must be somehow removed or killed. Traditionally, these plants have been removed either manually, by spraying the entire field with a herbicide which will kill the unwanted plants but leave the wanted crops, or selectively applying herbicides to only those unwanted plants. Unfortunately, each of these methods, in the past, has tended to be highly labor intensive.

In the selective application of herbicides to the unwanted plants, growers have been required to apply the herbicides by hand. However, certain newer devices provide for selective spraying using various types of complicated sensors. Selective herbicides tend to be more expensive and cannot be economically applied to an entire field. Also, selective herbicides are not available for all crops.

One prior art attempt to address this issue is disclosed in U.S. Pat. No. 4,709,505 issued to B. Lempa, Jr. on Dec. 1, 1987. Lempa discloses a simple device which provides a valve connected to a tank by a hose. An arm extends downwardly which, when the arm catches on a plant, opens the valve which causes spraying. Unfortunately, this device is not easily adjustable. Also, the long extending rod which is necessary to form the moment arm which allows a plant to open up a valve requires that the unwanted plants extending beyond the crops be very low to the ground but be significantly above the wanted crops.

A more complicated device for selective spraying of plants disclosed in U.S. Pat. No. 4,991,341, issued to B. Douglas on Feb. 12, 1991. This particular device uses a sensor such as an ultrasonic transducer to scan a certain area. The device also has a ground sensor which determines the speed of the tractor determine the amount of herbicide to be applied. Unfortunately, each of these designs requires a computer and complex optics.

Another simple method is disclosed in U.S. Pat. No. 4,187,638 issued to J. Hardy et al. on Feb. 12, 1980. In this particular embodiment, an elongated reservoir for a chemical is provided having wicks extending axially along the outside of the container. A chemical is absorbed within the wick. As plants contact the wick, the chemical is applied to the plants. Unfortunately, the amount of herbicide which is provided by the wick is very limited and difficult to control with precision.

The December 1991 issue of Farm Journal discusses generally two other types of sprayers. Each uses a type of sensor which scans a certain area. Each of the sensors apparently is an optic sensor. The optic sensors tend to be much more complex than are really necessary. The complexity adds to the cost of the overall device.

One characteristic of weed growth that is of benefit in the selective application of either a selective or non-selective herbicide is the tendency of weeds in certain crops to grow faster than the crops. Thus, early in the growing season, when crops are short, a direct application of a selective herbicide to weed foliage can be accomplished with good results, if equipment were available to detect the taller weeds and apply the herbicide in response.

What is needed, then, is a device for the selective spraying of herbicides which is not complex. The needed sprayer must be able to differentiate the crop canopy from the unwanted weeds. The device must be able to selectively apply herbicides in such a manner so as not to waste herbicides, while at the same time providing enough herbicide to kill the unwanted plants. The device must selectively spray herbicides so as to use less herbicide to kill the unwanted plants. This device is presently lacking in the prior art.

SUMMARY OF THE INVENTION

In the present device, an agricultural chemical applicator is provided which can be used with either selective or non-selective herbicides. A sensor bar is provided which, in the preferred embodiment, is placed on the front of a vehicle such as a tractor and extends laterally perpendicular to the direction of vehicle travel. Attached axially along the sensor bar are a plurality of conductive wire rod plant sensors to which a low voltage charge is continuously applied. When one of the sensors comes into contact with weed foliage, a current leakage through the plant to ground occurs. This current leakage triggers an electronic timer circuit which activates a solenoid controlled spray valve and nozzle corresponding to each sensor. The detector circuitry is programmable to permit the valve to open and close at the appropriate times for direct application of the herbicide to the weed which triggered the sensor.

The vertical position of the sensor bar can be adjusted hydraulically, depending upon the height of the crop canopy.

DESCRIPTION OF THE PREFERRED EMBODIMENT

Figure 1:
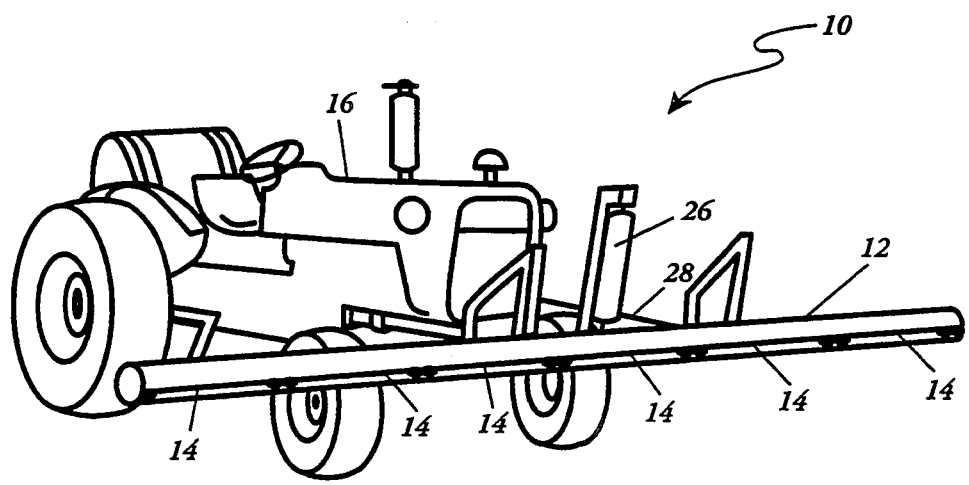
FIG. 1 is a perspective view of the device of the present invention showing the front section.

Referring now to FIG. 1, there is shown generally at 10 the agricultural chemical applicator of the present invention. Sensor bar 12 is mounted to tractor 16 through use of hydraulic cylinder 26 and bracket 28. Conversely, if tractor 16 already has some type of front end loader-type attachment, sensor bar 12 can be mounted on the loader attachment. Running axially along sensor bar 12 are a series of conductive wire rod electrodes which function as plant sensors 14. A low voltage is applied to each sensor 14 such that when any one of the sensors 14 contacts with plant foliage, current runs through the plant into the ground. This current leakage triggers tone decoder 34 and timers 38 and 40 (FIG. 3) which are part of the electronic detector and control circuit corresponding to each of sensors 14.

Figure 2:
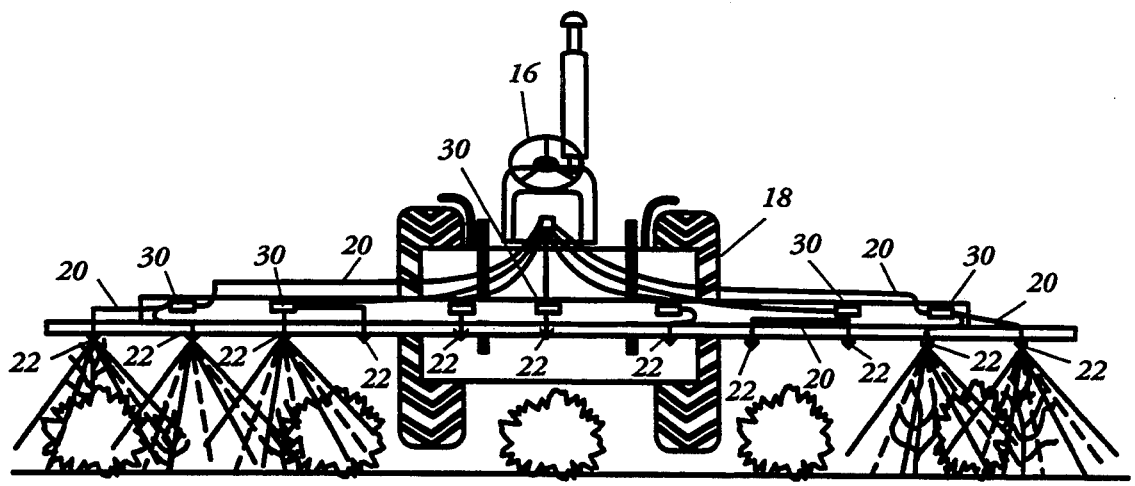
FIG. 2 is a perspective view of the device of the present invention showing the rear section.

Referring now to FIG. 2, there is shown generally at 10 the rear portion of the agricultural chemical applicator. A desired herbicide is placed in and flows out of tank 18 under pressure through hose 20 and out nozzle 22. Between each hose 20 and nozzle 22 there is a solenoid valve (See reference 30 in FIG. 3) which is operatively connected to the control circuit corresponding the sensor 14 on the front of tractor 16. Pressure is applied to the chemical in tank 18 just as with any sprayer which is well known in the art. This can be provided, for example, by attaching a pump to the power take off (PTO) shaft of a tractor.

Figure 3:
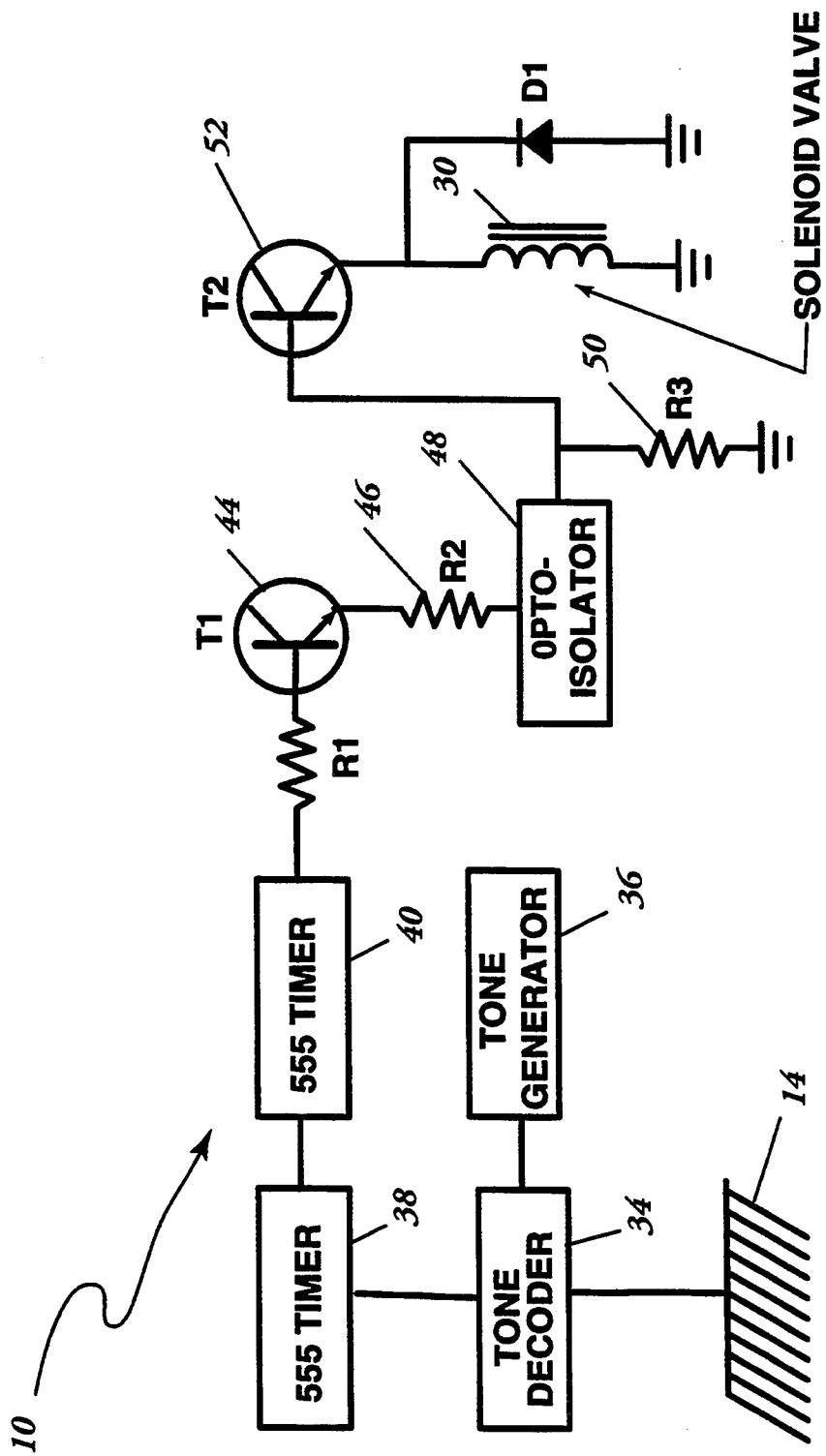
FIG. 3 is a schematic block diagram of one of the electronic detector and control circuits of the device.
Figure 4:
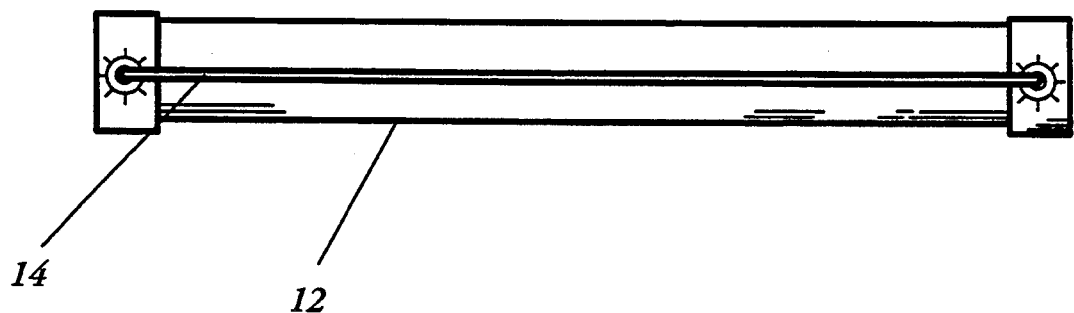
FIG. 4 is a front view of a plant sensor attached to a portion of the sensor bar.
Figure 5:
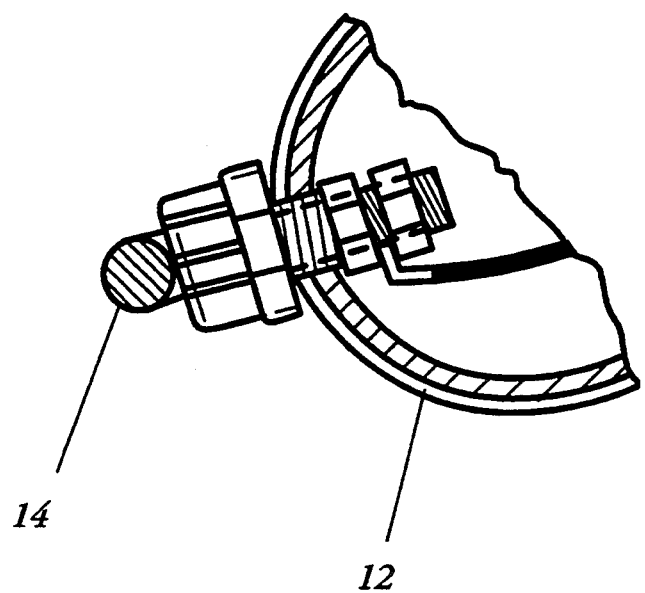
FIG. 5 is a side view of a plant sensor of the device.

Referring now to FIG. 3, there is shown generally a block diagram of a detector and control circuit portion of the agricultural chemical applicator. In the preferred embodiment, there will be a separate such circuit for each sensor 14 and valve 30 combination. Current leakage through sensor 14 activates tone decoder 34 to verify that the device is actually working. If a tone is not generated, then the operator can check the adjustments and operation of the system, such as by adjusting the vertical positioning of sensor bar 12. Concurrently with activating tone decoder 34, timers 38 and 40, which can be industry standard 555 timer chips, are activated. When the preset timer point is reached, the output of timer 40 is coupled to valve 30 through coupling resistor 42, transistor 44, resistor 46, opto-isolator device 48, and transistor 52. It will be apparent to those skilled in the art that the design of the detector and control circuitry is conventional in nature and can be modified as long as elements are included which can detect current leakage through sensor 14 and have adjustable start and stop times. In a preferred, opto-isolator 48 is an EGC 3041, transistor 44 is a 2N2222, and transistor 52 is an EGC188.

It will also be apparent to those skilled in the art that a plurality of detector and control circuits, as shown in FIG. 3, can be centrally programmed from a microprocessor device (not shown) mounted on tractor 16. In this way, the operator can simultaneously program timers 38 and 40 to adjust the timing of the opening and closing of valves 30 following triggering by corresponding sensor 14.

The rear section of device 10 which is shown in FIG. 2 can be mounted onto the back or front of a tractor at a three point hitch or a hydraulically-controlled bracket. Mounting on a three point hitch allows the device to be raised and lowered, depending upon the desire of the user.

If the operator wants to activate one or more valves 30 independent of sensors 14, a push button panel or equivalent manual control means can be located in the tractor cab which will directly activate valves Finally, if preferred, a mechanical wiper arm switch can be used as a sensor 14 rather than a wire rod and current leakage sensor combination. In this embodiment, wiper switch sensor 14 (not shown) directly activates decoder 34 and timer 38 when the wiper arm is moved by a contacted weed.

Figure 6:
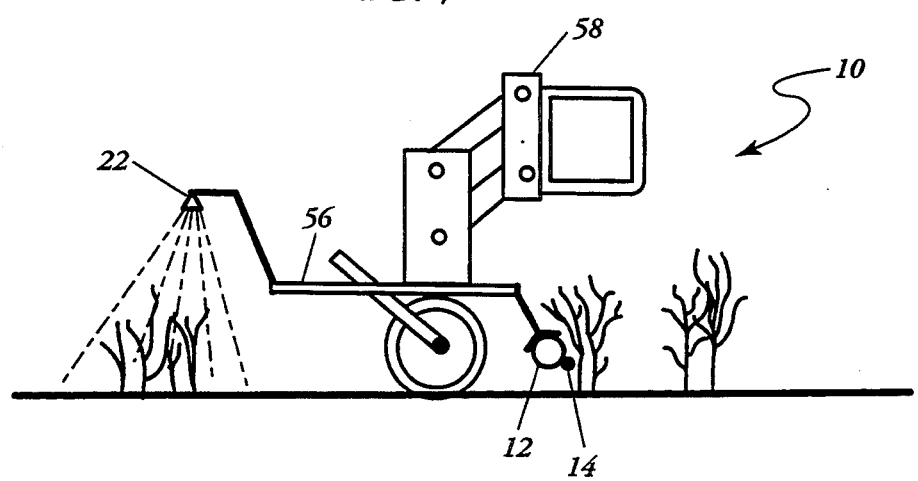
FIG. 6 is a side view of a plant sensor attached to a portion of the sensor bar attached to a cultivator row unit.

Referring now to FIG. 6, there is shown generally at 10 another embodiment of the agricultural chemical applicator for applying herbicides of the present invention. Electrodes 14 attached to a portion of sensor bar 12 attached to row unit 56 of standard cultivator 58. This application shows that device 10 is subject to mass application on multi-row cultivator 58 as opposed to a simple spraying rig which is shown in FIGS. 1 and 2.

Figure 7:
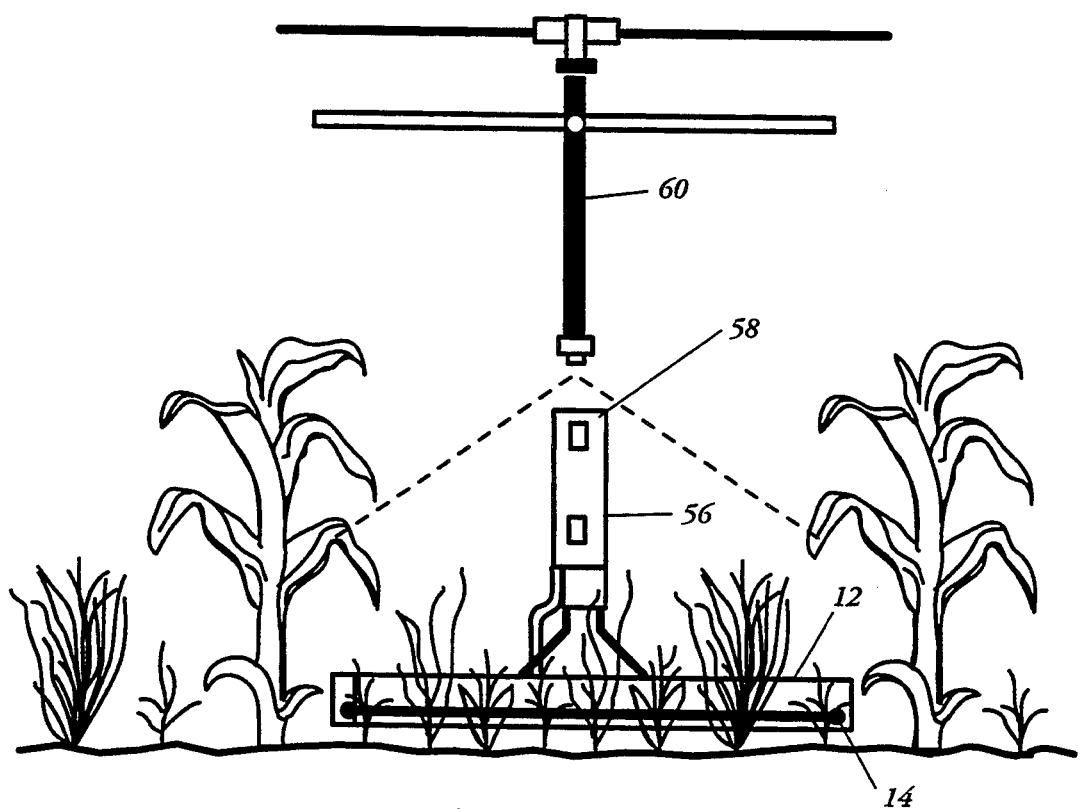
FIG. 7 is a front view of a plant sensor mounted to a cultivator row unit ahead of a standard drop nozzle arrangement for herbicide application in corn.

Referring now to FIG. 7, there is shown generally at 10 still another embodiment of the present invention. Plant sensor 14 is mounted to row unit 56 of cultivator 58 ahead of standard drop nozzle arrangement 60 for herbicide application in corn. This device is especially effective for selectively spraying herbicides in cornfields where the unwanted plants tend to lie in sporadic patches.

Thus, although there have been described particular embodiments of the present invention of a new and useful Agricultural Chemical Applicator, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. An agricultural chemical applicator for applying herbicides attached to a vehicle having a front side and a rear side, said device comprising:
    a. an unwetted sensor bar attached to said vehicle;
    b. at least one sensor extending axially along said sensor bar;
    c. means to provide electric charge to said sensor;
    d. means to detect a current flow from said sensor;
    e. means to spray said plant extending above said crops for a duration;
    f. means to send a delayed message having a length of delay from said sensor means to said spray means; and
    g. means for adjusting said length of said delayed message to adjust said duration of said spray.

2. The device of claim 1 wherein said sensor bar is vertically adjustable.

3. The device of claim 1 wherein said sensor means comprises a wiper.

4. The device of claim 1 wherein said spray means comprises:
    a. a chemical reservoir;
    b. a nozzle;
    c. a hose connecting said reservoir to said nozzle;
    d. a valve activated by said timing means; and
    e. means for adjusting said length of delay of said delayed message to adjust said delay of said spray.

5. The device of claim 4, wherein said valve comprises a solenoid valve.

6. The device of claim 1 wherein said timing means comprises:
    a. a first 555 timer chip activated by said sensor means;
    b. a 555 second timer chip activated by said first 555 timer chip;
    c. a first resistor connected to said second 555 timer chip;
    d. a first transistor electronically connected to said first resistor;
    e. a second resistor electronically connected to said first transistor;

f. an opto-isolator electronically connected to said second resistor;
g. a second transistor electronically connected to said opto-isolator; and
h. a solenoid valve electronically connected to said second transistor.

7. An agricultural chemical applicator for applying herbicides attached to a row unit of a cultivator, said row unit having a front side and a rear side, said device comprising:
   a. physical contact means for non-optically sensing the presence of a plant extending above crops;
   b. means for spraying said plant; and
   c. a tuned circuit electronically connected to said physical contact means and activating said means for spraying said plant.

8. The device of claim 7 wherein said sensor bar is vertically adjustable.

9. The device of claim 7 wherein said means for non-optically sensing the presence of a plant comprises a wiper.

10. The device of claim 7 wherein said means for spraying said plant comprises:
    a. a chemical reservoir;
    b. a nozzle;
    c. a hose connecting said reservoir to said nozzle; and
    d. a valve activated by a delay timing means.

11. The device of claim 10 wherein said valve comprises a solenoid valve.

12. The device of claim 7 further comprising a means for timing said spray having:
    a. a first timer circuit activated by said sensor means;
    b. a second timer activated by said first timer circuit;
    c. a first resistor connected to said second timer circuit;
    d. a first transistor electronically connected to said first resistor;
    e. a second resistor electronically connected to said first transistor;
    f. an opto-isolator electronically connected to said second resistor;
    g. a second transistor electronically connected to said opto-isolator; and
    h. a solenoid valve electronically connected to said second transistor.

13. The device of claim 7 wherein said means for spraying said plant comprises:
    a. a chemical reservoir;
    b. a drop nozzle
    c. a hose connecting said reservoir to said drop nozzle; and
    d. a valve activated by a delay timing means.

14. The device of claim 7 further comprising means for adjusting said length of said delayed message to adjust said duration of said spray.

15. The device of claim 7 wherein said tuned circuit comprising means for sending a delayed message having a length of delay from said sensor means to said spray means.

16. The device of claim 15 further comprising means for adjusting said length of said delay.

17. The device of claim 7 wherein said means for sensing the present of a plant comprises:
    a. a sensor bar attached to said row unit;
    b. at least one unwetted sensor extending axially along said sensor bar;
    c. means to provide electric charge to said sensor; and
    d. said tuned circuit detecting a current flow from said sensor.

18. An agricultural chemical applicator which senses plant foliage, said agricultural chemical applicator attached to a tractor having a front end and a rear end, said agricultural chemical applicator comprising:
    a. an un-wetted sensor bar attached to said front end of said tractor;
    b. a series of conductive wire rod electrodes which function as plant sensors running along said sensor bar;
    c. a low applied voltage electronically connected to each of said conductive wire rod electrodes such that when any one of said sensors contacts with said plant foliage a current runs through said plant foliage thereby causing current leakage;
    d. an electronic detector and control circuit having a timer, said electronic detector and control circuit electronically connected to said plant sensors to determine said current flowing to said plants; and
    e. means for delivering a chemical attached to said rear end of said tractor, said means for delivering a chemical having a valve operatively connected to said electronic detector and control circuit.

19. The agricultural chemical applicator of claim 18 wherein said electronic detector and control circuit further comprising a tone decoder within said electronic detector electronically connected to said control circuit.

* * * * *